US011872598B2

(12) United States Patent
Jones

(10) Patent No.: US 11,872,598 B2
(45) Date of Patent: Jan. 16, 2024

(54) TOWEL INCLUDING SCRUBBING ELEMENT

(71) Applicant: Brian Jones, Ladera Ranch, CA (US)

(72) Inventor: Brian Jones, Ladera Ranch, CA (US)

( * ) Notice: Subject to any disclaimer, the term of this patent is extended or adjusted under 35 U.S.C. 154(b) by 0 days.

(21) Appl. No.: 17/659,149

(22) Filed: Apr. 13, 2022

(65) Prior Publication Data

US 2023/0330708 A1 Oct. 19, 2023

(51) Int. Cl.
*B08B 1/00* (2006.01)
*A47L 25/00* (2006.01)
*A47L 13/16* (2006.01)

(52) U.S. Cl.
CPC .............. *B08B 1/006* (2013.01); *A47L 13/16* (2013.01); *A47L 25/00* (2013.01)

(58) Field of Classification Search
CPC ......... A63B 57/60; A63B 60/36; A63B 47/04; A47K 10/02; A47L 23/10; A47L 13/16
See application file for complete search history.

(56) References Cited

U.S. PATENT DOCUMENTS

| | | | | | |
|---|---|---|---|---|---|
| D330,140 | S * | 10/1992 | Lerner | D6/608 |
| 6,138,595 | A * | 10/2000 | Croyle | A41D 27/204 2/247 |
| 7,789,091 | B2 * | 9/2010 | Anderson | A61B 17/54 132/76.4 |
| 9,162,125 | B1 * | 10/2015 | McBryde | A46B 5/0008 |
| 10,188,919 | B2 * | 1/2019 | Williams | A47L 13/16 |
| 2006/0075589 | A1 * | 4/2006 | Choi | A63B 47/04 15/210.1 |
| 2007/0094826 | A1 * | 5/2007 | Chandler | A63B 60/36 15/210.1 |

FOREIGN PATENT DOCUMENTS

| | | | | |
|---|---|---|---|---|
| CA | 2720330 A1 * | 8/2011 | A47G 27/0206 |
| KR | 20120005815 U * | 8/2012 | |
| WO | WO-2006079075 A2 * | 7/2006 | D03D 15/00 |

* cited by examiner

*Primary Examiner* — Shay Karls
(74) *Attorney, Agent, or Firm* — Maschoff Brennan

(57) ABSTRACT

An example towel may include a main body and a scrubbing element coupled to a first side of the main body. The main body may include a first material. The scrubbing element may include a second material that may be different from the first material.

18 Claims, 3 Drawing Sheets

TOWEL INCLUDING SCRUBBING ELEMENT

FIELD

Embodiments described herein relate to a towel and, in particular, to a towel including a scrubbing element.

BACKGROUND

Unless otherwise indicated in the present disclosure, the materials described in the present disclosure are not prior art to the claims in the present application and are not admitted to be prior art by inclusion in this section.

Towels are often used to dry various objects, which may include people, sports equipment, automobiles, and the like. In some circumstances, towels may be used to clean various objects, which may include removing dirty water or moisture from the various objects or wiping substances from the various objects.

The subject matter claimed in the present disclosure is not limited to implementations that solve any disadvantages or that operate only in environments such as those described above. Rather, this background is only provided to illustrate one example technology area where some implementations described in the present disclosure may be practiced.

SUMMARY

In an embodiment, a towel may include a main body and a scrubbing element coupled to a first side of the main body. The main body may include a first material. The scrubbing element may include a second material that may be different from the first material.

The object and advantages of the embodiments will be realized and achieved at least by the elements, features, and combinations particularly pointed out in the claims. It is to be understood that both the foregoing general description and the following detailed description are exemplary and explanatory and are not restrictive of any invention as claimed.

BRIEF DESCRIPTION OF THE DRAWINGS

Example embodiments will be described and explained with additional specificity and detail through the use of the accompanying drawings in which.

DESCRIPTION OF EMBODIMENTS

Towels are synonymous with absorbent characteristics as towels are often used to dry moisture from various objects, such as people, dishware, sporting goods, automobiles, and the like. In some circumstances, an object may include one or more additional substances attached to the objects which may be in addition to moisture associated with the object. It may be desirable to remove both the additional substances and the moisture which may include using a towel to wipe off the moisture and the additional substances.

In some circumstances, it may be undesirable to wipe the additional substances from an object as it may dirty the towel and/or damage the towel. For example, in instances in which mud is an additional substance on an object, such as a football, it may be undesirable to get mud on a towel as it may render it less useful in future drying situations.

In some circumstances, the additional substances may be adhered to the object such that it may be difficult to wipe off the additional substances with a towel. For example, in instances in which dirt is attached to a golf club and/or lodged in the grooves thereof, wiping the golf club with a towel may not remove the dirt and/or the towel may be unsuitable to remove dirt from the groove portions of the golf club.

In circumstances in which scrubbing an object may contribute to cleaning and/or drying the object, the towel may not include a coarse portion designed for scrubbing, may be slippery, difficult to handle, and/or may not include a substance or object that may improve a user's grip which may, in turn, improve the scrubbing and/or cleaning of the towel relative to the object.

Aspects of the present disclosure address these and other shortcomings of prior approaches by combining a scrubbing element with a towel. In some embodiments, the scrubbing element may be used for scrubbing and/or removing coarse debris that may be attached to an object. For example, in instances in which a golf club is the object to be cleaned, the scrubbing element may be configured to remove dirt and/or grass therefrom, which may include removing dirt and/or grass from the groove portions of the golf club such that the cleaned golf club may be more effective in ball striking compared to the dirty golf club. In some embodiments, the scrubbing element may include an abrasive or a non-abrasive material. A main body of the towel may be used to dry the object and/or remove fine debris therefrom. In some embodiments, an area of the scrubbing element may be smaller than an area of the main body of the towel. In some embodiments, a grip material may be included which may provide grip for a user using the towel and/or abrasive element to clean, scrub, and/or dry an object.

Embodiments of the present disclosure will be explained with reference to the accompanying drawings.

Figure 1:
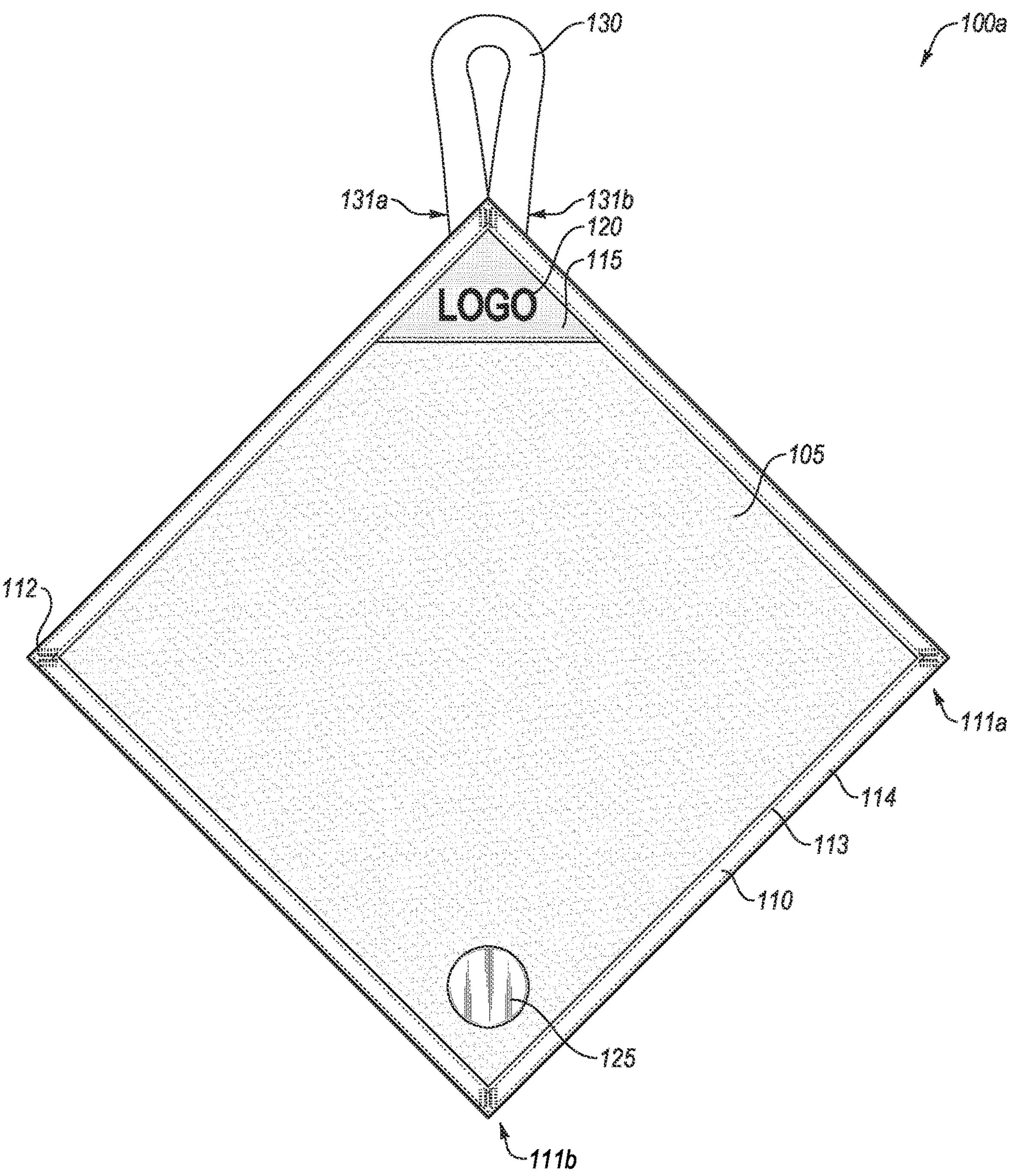
FIG. 1 illustrates a front side of an example towel.

FIG. 1 illustrates a front side of an example towel 100*a*, in accordance with at least one embodiment described in the present disclosure. In some embodiments, the towel 100*a* may include a main body 105, optional trim elements 110, an optional corner element 115, an optional logo 120, an optional grip material 125, and an optional fabric strip 130. The trim elements 110 may include a first end 111*a*, a second end 111*b*, a bar tack stitching 112, a first hem 113, and a second hem 114. The fabric strip 130 may include a first end 131*a* and a second end 131*b*.

In some embodiments, the main body 105 may include a towel-like fabric that may be configured to capture and/or remove moisture from an object. For example, the main body 105 may be used to remove water and/or grass clippings that may accumulate on a golf club. In some embodiments, the main body 105 may include one or more materials that may be configured to capture and/or remove moisture from an object. For example, the fabric of the main body 105 may include a polyester polyamide blend, cotton, a polyester polyurethane blend, a polyester nylon blend, bamboo, and the like. In instances in which the fabric of main body 105 is a polyester polyamide blend, the ratio of polyester to polyamide may be between approximately 6:1 and 2:1. For example, in instances in which the fabric of main body 105 is a polyester polyamide blend, the ratio of polyester to polyamide may be approximately 4:1.

In some embodiments, the main body 105 may include a waffle texture. For example, the fabric included in the main body 105 may include a waffle texture including raised rectangular portions adjacent to depressed rectangular portion. Alternatively, or additionally, the texture of the main body 105 may include other textures that may be compatible with a towel, such as substantially smooth, various patterns (e.g., honeycomb, geometric shapes, etc.), and the like. In some embodiments, the texture of the main body 105 may be associated with the fabric type of the main body 105.

In some embodiments, the main body 105 may include a towel weight that may be expressed in grams per square meter (GSM). In some embodiments, the towel weight of the main body 105 may be between approximately 300 GSM and 900 GSM. For example, the towel weight of the main body 105 may be approximately 400-600 GSM or 500 GSM. In some embodiments, the towel weight of the main body 105 may be associated with the type of fabric used in the main body 105. For example, a cotton fabric may include a towel weight of approximately 650 GSM and a polyester polyamide blend may include a towel weight of approximately 500 GSM. Alternatively, or additionally, the towel weight of the main body 105 may be associated with the texture used in the main body 105. For example, the main body 105 including a waffle texture may include a towel weight of approximately 320 GSM and the main body 105 including a smooth texture may include a towel weight of approximately 600 GSM. In these and other embodiments, the towel weight may be independent of the type of fabric and/or the towel texture. For example, a first main body may include a smooth, cotton fabric and texture and may include a towel weight of approximately 300 GSM and a second main body may include a smooth, cotton fabric and texture and may include a towel weight of approximately 800 GSM.

In some embodiments, the main body 105 may include a substantially square shape. Alternatively, or additionally, the main body 105 may include a rectangular, circular, oval, triangular, or any other geometric shape that may be suitable for a towel.

In some embodiments, the trim elements 110 may be coupled to edge portions of the main body 105. For example, in instances in which the main body 105 is a square, the trim elements 110 may be coupled to each side of the main body 105, such that four trim elements 110 may be coupled to the main body 105.

In some embodiments, the trim elements 110 may include a fabric that may differ from the fabric of the main body 105. For example, the trim elements 110 may include a cotton twill fabric and the main body 105 may include a polyester polyamide blend. Alternatively, or additionally, the fabric of the trim elements 110 and the main body 105 may be the same or similar. For example, the trim elements 110 may include a cotton fabric and the main body 105 may include a cotton fabric.

In some embodiments, the fabric of the trim elements 110 may include a fade resistant material. For example, a color associated with the trim elements 110 may be resistant to fading which may include in the presence of sunlight, repeated washings, etc. For example, in instances in which the color of the trim elements 110 is black, the color of the trim elements 110 may remain substantially black (e.g., not fade to gray or brown) in the presence of sunlight, washing, etc.

In some embodiments, the trim elements 110 may include an ultraviolet (UV) resistant material. For example, the trim elements 110 may be resistant to degradation due to the presence of UV light. For example, the trim may have Grade 4 (slight fading) or Grade 5 (no fading) degree of fading after being exposed to a light source (an enclosed carbon-arb lamp, continuous light; an enclosed carbon-arc lamb, alternate light and dark; a xenon-arc lamp, continuous light, black panel option; a xenon-arc lamp, alternate light and dark; a xenon-arc lamp, continuous light, black standard option; or daylight behind glass) for 40 hours as described in American Association of Textile Chemists & Colorists (AATCC) standard test AATCC 16 Colorfastness To Light.

In some embodiments, the trim elements 110 may include a fabric that includes a medium weight, e.g., about 400-600 GSM.

In some embodiments, the trim elements 110 may include the first end 111*a* and the second end 111*b*, where both the first end 111*a* and second end 111*b* may include a mitered edge. The mitered edge of the first end 111*a* and the second end 111*b* of the trim elements 110 may be complementary to each other such that a mitered edge associated with the first end 111*a* of a first trim element may align with a mitered edge associated with the second end 111*b* of a second trim element. In some embodiments, an angle of the mitered edge may be based on the number of trim elements 110 and/or the shape of the main body 105. For example, in instances in which the main body 105 is a square, the angle of the mitered edges may be approximately forty-five degrees.

In some embodiments, the mitered edges of the trim elements 110 may be coupled to one another with a stitching, such as the bar tack stitching 112. Alternatively, or additionally, the mitered edges of the trim elements 110 may be coupled together with other fasteners, such as glue, other forms of stitching, clasps, snaps, and the like. In instances in which the bar tack stitching 112 is used, the width of the bar tack stitching 112 may be based on the width of the trim elements 110. For example, the ratio of the width of the bar tack stitching 112 to the width of the trim elements 110 may be between approximately 1:2 and 4:5. For example, the ratio of the width of the bar tack stitching 112 to the width of the trim elements 110 may be approximately 2:3. Alternatively, or additionally, the width of the bar tack stitching 112 may include a predetermined size. For example, the width of the bar tack stitching 112 may be approximately one-half inch.

In some embodiments, the trim elements 110 may include a width. The width of the trim elements 110 may vary based on the size of the towel 100*a* and/or the main body 105. For example, ratio of the width of the trim elements 110 to the width of the towel 100*a* may be between approximately 1:10 and 1:50 or between approximately 1:20 and 1:25. For example, the ratio of the width of the trim elements 110 to the width of the towel 100*a* may be approximately 1:24. Alternatively, or additionally, the width of the trim elements 110 may include a predetermined size. For example, the width of the trim elements 110 may be approximately three quarters of an inch.

In some embodiments, the trim elements 110 may include one or more hems, which may couple the trim elements 110 to the main body 105. For example, the trim elements 110 may include the first hem 113 and the second hem 114. In some embodiments, the first hem 113 and the second hem 114 may be equally spaced across the width of the trim elements 110. For example, the first hem 113 may be located approximately one-quarter to one-half or about one-third the width of the trim elements 110 as measured from a body edge (e.g., an edge of the trim elements 110 adjacent to the main body 105) and the second hem 114 may be located approximately one-half to three-quarters or two-thirds the width of the trim elements 110 as measured from the body edge. Alternatively, or additionally, the first hem 113 and the second hem 114 may be unequally spaced across the width of the trim elements 110. For example, the first hem 113 may be located approximately one-sixth the width of the trim elements 110 as measured from the body edge and the second hem 114 may be located approximately two-thirds the width of the trim elements 110 as measured from the body edge.

In some embodiments, the corner element 115 may be disposed in one or more vertices of the towel 100*a* and/or the main body 105. For example, in instances in which the main body 105 is square, the corner element 115 may be disposed in one of the vertices thereof. In instances in which the main body 105 does not include a vertex (e.g., when the shape of the main body is round or oval), the corner element 115 may be disposed adjacent to an edge of the main body 105. In these and other embodiments, the corner element 115 may be located adjacent to the fabric strip 130. For example, in instances in which the main body 105 is square and the corner element 115 is disposed at a first vertex of the main body 105, the fabric strip 130 may be disposed adjacent to the first vertex of the main body 105.

In some embodiments, the corner element 115 may be disposed on a portion of the towel 100*a* that may be adjacent to the fabric strip 130. Alternatively, or additionally, the corner element 115 may be disposed on a portion of the towel 100*a* opposite the grip material 125. For example, in instances in which the towel 100*a* includes a square shape and the fabric strip 130 is disposed adjacent to a first vertex thereof, the corner element 115 may be disposed in the first vertex of the towel 100*a*.

In some embodiments, the corner element 115 may include a hem for coupling the corner element 115 to the main body 105. For example, in instances in which the corner element 115 is triangular, such as to be complementary with the main body 105 that may be square shaped, the hypotenuse of the corner element 115 may include a hem which may couple the corner element 115 to the main body 105. In some embodiments, a hem associated with the corner element 115 may occur at or near the edge not adjacent to the trim elements 110. Referring to the previous example, the location of the hem relative to the hypotenuse may be proportional to the altitude of the corner element 115 at a ratio of approximately 1:12. For example, in instances in which the altitude of the corner element 115 is approximately three inches, the distance the hem of the corner element 115 is from the hypotenuse may be approximately one-quarter of an inch.

Alternatively, or additionally, the corner element 115 may be arranged such that a portion of the corner element 115 may be located under the first hem 113 and/or the second hem 114 of the trim elements 110. For example, the corner element 115 may be sized and shaped to cover a corner portion of the main body 105 such that when the trim elements 110 are coupled to the main body 105, the trim elements 110 are also configured to couple the corner element 115 to the main body 105.

In some embodiments, the size of the corner element 115 may be based on the size of the towel 100*a* and/or the main body 105. For example, the ratio of the area of the main body 105 to the area of the corner element 115 may be between approximately 30:1 and 40:1, between approximately 34:1 and 38:1, or between approximately 35:1 and 37:1. For example, the ratio of the area of the main body 105 to the area of the corner element 115 may be approximately 36:1. Alternatively, or additionally, the size of the corner element 115 may include a predetermined size. For example, the width of the corner element 115 may be approximately six inches and the height of the corner element 115 may be approximately three inches such that the area of the corner element 115 may be approximately nine square inches (e.g., as the corner element 115 may include a triangular shape).

In some embodiments, the logo 120 may be affixed on the corner element 115. Alternatively, or additionally, the logo 120 may be affixed to the main body 105, such as where the corner element 115 may be placed. Alternatively, or additionally, the logo 120 may be affixed to any portion of the towel 100*a*, which may include any portion of the main body 105, the trim elements 110, and/or the corner element 115. In some embodiments, the logo 120 may include a high-density ink, such as a specialty plastisol ink. For example, a high-density ink may result in the logo 120 including a raised portion above the surface the logo 120 is affixed to, such as the corner element 115. In some embodiments, the edge portions of the logo 120 may include a squared edge. Alternatively, or additionally, the edge portions of the logo 120 may include a rounded edge.

In some embodiments, the grip material 125 may be coupled to the main body 105. Alternatively, or additionally, the grip material 125 may be coupled to a corner element 115, which in turn, may be coupled to the main body 105.

In some embodiments, the grip material 125 may include a non-slip and/or matte finish. For example, the grip material 125 may include a silicone base material that may include a matte and a non-slip finish. Alternatively, or additionally, the grip material 125 may include other materials that may provide a grip to the user. For example, the grip material 125 may include any rubber-like materials which may include rubber, synthetic rubber such as ethylene propylene diene monomer (EPDM), neoprene, latex, and/or various elastomers that include the property of viscoelasticity. Alternatively, or additionally, the grip material 125 may include an embroidery component or pattern. In these and other embodiments, the grip material 125 may be configured to provide an improved grip to a user relative to the user hold the main body 105 alone.

In some embodiments, the grip material 125 may be affixed to the main body 105 using a heated material, such as a heated silicone (also referred to as a "silicone heat transfer"). In some embodiments, the silicone precursor to the grip material 125 may be adhered to the main body using a heated glue (also referred to as "heat transfer glue"). The heated glue may include an industrial strength and may be configured to withstand degradation in the presence of repeated washings of the towel 100*a*, such as at least 100 washes, at least 500 washes, or at least 1000 washes. For some materials, the silicone precursor may directly adhere to the material of main body 105. Alternatively, or additionally, the grip material 125 may be affixed to the main body 105 using a fastener that may differ from glue as described herein. For example, the grip material 125 may be sewn to the main body 105, and/or attached using complementary interfacing components such as buttons, snaps, hook and loop, etc.

In some embodiments, the grip material 125 may include a tiered surface where a first portion of the grip material 125 may extend further from the main body 105 relative to a second portion of the grip material 125. In some embodiments, the tiered surface of the grip material 125 may contribute to an improved grip in conjunction with the material of the grip material 125. For example, a grip material 125 that includes a tiered surface in addition to a non-slip silicone material may provide an improved grip when handled relative to handling a grip material 125 that includes only a non-slip silicone material and/or relative to handling a towel material associated with the main body 105.

In some embodiments, the grip material 125 may be disposed on a portion of the towel 100*a* opposite the fabric strip 130. For example, in instances in which the towel 100*a* includes a square shape and the fabric strip 130 is disposed adjacent to a first vertex thereof, the grip material 125 may be disposed in a vertex furthest from the first vertex. In these and other embodiments, the grip material 125 may be disposed on a portion of the main body 105 that may include a greater amount of maneuverability than other portions of the main body 105. For example, in instances in which the towel 100*a* is hung from or attached to another object, such as via the fabric strip 130, the grip material 125 may be located remote from the point of attachment.

In some embodiments, the fabric strip 130 may include the first end 131*a* and the second end 131*b*, where both the first end 131*a* and the second end 131*b* may be coupled to the main body 105 such that a loop is formed by the fabric strip 130. In some embodiments, the fabric strip 130 may be coupled to the main body 105 by the first hem 113 and/or the second hem 114 associated with the trim elements 110. For example, portions of the fabric strip 130 may be disposed between the trim elements 110 such that the first hem 113 and/or the second hem 114 may also hem the fabric strip 130.

In some embodiments, the fabric strip 130 may be disposed between the main body 105 and the corner element 115. For example, the first end 131*a* and the second end 131*b* of the fabric strip 130 may be covered by the corner element 115, such that the first end 131*a* and the second end 131*b* may not be visible. Alternatively, or additionally, the fabric strip 130 may be arranged such that the first end 131*a* and the second end 131*b* may be obscured by the trim elements 110 regardless of the corner element 115 being present on the towel 100*a*. For example, the first end 131*a* and the second end 131*b* may each be sized and shaped to be obscured by the trim elements 110 when the trim elements 110 are hemmed to the main body 105.

In some embodiments, the fabric strip 130 may include a material that may differ from the material of the main body 105 and the material of the trim elements 110. For example, the material associated with the fabric strip 130 may include a jacquard elastic webbing material. In some embodiments, the material of the fabric strip 130 may be double sided. For example, a first side of the fabric strip 130 may include a first design and/or logo and a second side of the fabric strip 130 may include a second design and/or logo.

In some embodiments, the fabric strip 130 may include a length based on the size of the towel 100*a*. For example, the ratio of the length of the fabric strip 130 to a length of a side of the main body 105 (e.g., in instances in which the main body 105 is square) may be between approximately 1:3 and 2:3. The ratio may be before the fabric strip 130 may be folded to create a loop, such that the ratio of the length of a folded fabric strip 130 to a length of a side of the main body 105 may be between approximately 1:6 and 1:3. Alternatively, or additionally, the length of the fabric strip 130 may be associated with the width of the fabric strip 130. For example, the ratio of the length of the fabric strip 130 to the width of the fabric strip 130 may be between approximately 8:1 and 12:1. As an example, the length of the fabric strip 130 may be approximately eleven inches and the width of the fabric strip may be approximately one and a quarter inch.

In some embodiments, the fabric strip 130 may be elastic such that in instances in which the fabric strip 130 includes a looped portion, the fabric strip 130 may be configured to stretch over an object larger than the looped portion and the towel 100*a* may hang from the object via the fabric strip 130. In some embodiments, the fabric strip 130 may reduce the likelihood of using an additional attachment mechanism or device, such as a carabiner, to couple the towel 100*a* to an object. Alternatively, or additionally, the fabric strip 130 may be sized and shaped to contribute to the storage of the towel 100*a* in a storage configuration. For example, the towel 100*a* may be folded, rolled up, or otherwise compacted into a storage configuration and the fabric strip 130 may be configured to hold the towel 100*a* in the storage configuration. For example, in instances in which the fabric strip 130 is looped, the fabric strip 130 may loop around the towel 100*a* in the storage configuration and the fabric strip 130 may maintain the towel 100*a* in the storage configuration.

Modifications, additions, or omissions may be made to the towel 100*a* without departing from the scope of the present disclosure. For example, in some embodiments, the towel 100*a* may include any number of other components that may not be explicitly illustrated or described.

Figure 2:
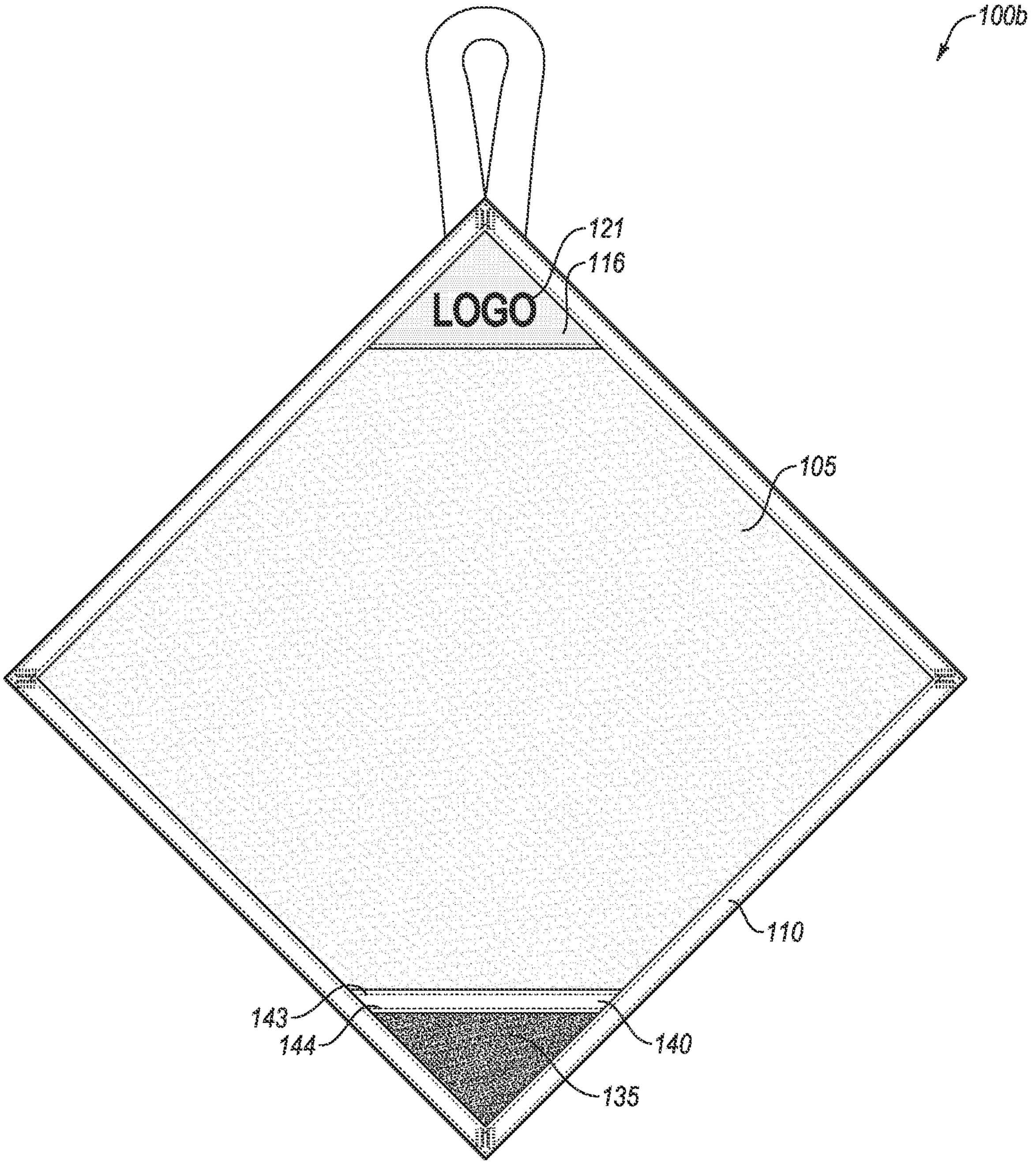
FIG. 2 illustrates a back side of an example towel including scrubbing element.

FIG. 2 illustrates a back side of an example towel 100*b* including a scrubbing element, in accordance with at least one embodiment described in the present disclosure. In some embodiments, the towel 100*b* may include a main body 105, trim elements, 110, a corner element 116, a logo 121, a scrubbing element 135, and a binding strip 140. The binding strip 140 may include a first hem 143 and a second hem 144.

In some embodiments, one or more elements of the towel 100*b* of FIG. 2 may be the same or similar as one or more elements of the towel 100*a* of FIG. 1, such as different sides of the same element. For example, the main body 105 and the trim elements 110 of the towel 100*b* of FIG. 2 may illustrate a second side of the main body 105 and the trim elements 110 of the towel 100*a* of FIG. 1. Alternatively, or additionally, one or more elements of the towel 100*b* of FIG. 2 may be the same or similar as one or more element of the towel 100*a* of FIG. 1, such as a similar element disposed on both sides of a towel. For example, the corner element 116 and the logo 121 of FIG. 2 may be the same or similar as the corner element 115 and the logo 120 of FIG. 1, respectively.

In some embodiments, the scrubbing element 135 may include a scour pad. For example, a scour pad may be coupled to the main body 105 of the towel 100*b* which may be used to scrub and/or brush away coarse debris on an object. Alternatively, or additionally, the scrubbing element 135 may include other scrubbing materials such as stiff bristles, a pattern or fiber on a cloth, textile, or substrate that is course and/or stiff (including a woven or non-woven cloth, textile or substrate), steel wool, and/or scouring pads, including abrasive or non-abrasive scouring pads, comprising various materials, such as synthetic fibers (including course or stiff synthetic fibers), copper, aluminum, and/or other applicable abrasive elements. In some embodiments, the scrubbing element 135 may include a non-abrasive material. For example, the scrubbing element 135 may include a non-scratch scouring pad or similar material.

In some embodiments, the scrubbing element 135 may be disposed on a portion of the towel 100*b* opposite the fabric strip 130. For example, in instances in which the towel 100*b* includes a square shape and the fabric strip 130 is disposed adjacent to a first vertex thereof, the scrubbing element 135 may be disposed in a vertex furthest from the first vertex. In these and other embodiments, the scrubbing element 135 may be disposed on a portion of the main body 105 that may include a greater amount of maneuverability than other portions of the main body 105. For example, in instances in which the towel 100*b* is hung from or attached to another object, such as via the fabric strip 130, the scrubbing element 135 may be located remote from the point of attachment. In these and other embodiments, in instances in which the towel 100*b* is coupled to an object via the fabric strip 130, moisture in the towel may be directed to the scrubbing element 135 via gravity, such that the scrubbing element 135 may remain damp or moist longer than other portions of the towel 100*b*. For example, moisture absorbed by the main body 105 may be directed toward the scrubbing element 135 in instances in which the towel 100*b* is hung from an object via the fabric strip 130.

In some embodiments, the scrubbing element 135 may be disposed in a similar location on the towel 100*b* relative to the location of the grip material 125 on the towel 100*a*. For example, in instances in which the grip material 125 is located at or near a first vertex of the towel 100*a*, the scrubbing element 135 may be located at or near the first vertex of the towel 100*b*. In these and other embodiments, the locations of the scrubbing element 135 and the grip material 125 may be mirrored. For example, a center point of the scrubbing element 135 relative to the main body 105 may be approximately the same as a center point of the grip material 125 relative to the main body 105.

In some embodiments, the size of the scrubbing element 135 may be based on the size of the towel 100*b* and/or the main body 105. For example, the ratio of the area of the main body 105 to the area of the scrubbing element 135 may be between approximately 5:1 and 100:1, between approximately 10:1 and 50:1, between approximately 10:1 and 40:1, between approximately 30:1 and 40:1, between approximately 34:1 and 38:1, or between approximately 35:1 and 37:1. For example, the ratio of the area of the main body 105 to the area of the scrubbing element 135 may be approximately 36:1. Alternatively, or additionally, the size of the scrubbing element 135 may include a predetermined size. For example, the width of the scrubbing element 135 may be approximately six inches and the height of the scrubbing element 135 may be approximately three inches such that the area of the scrubbing element 135 may be approximately nine square inches (e.g., as the scrubbing element 135 may include a triangular shape). In some embodiments, the size of the scrubbing element 135 may be the same or similar as the size of the corner element 116, and/or the corner element 115 as illustrated and described in FIG. 1. Alternatively, or additionally, the size of the scrubbing element 135 may be larger or smaller than the corner element 116.

In some embodiments, the binding strip 140 may be configured to cover at least a portion of the scrubbing element 135. For example, the binding strip 140 may cover at least one edge of the scrubbing element 135. Alternatively, or additionally, the binding strip 140 may contribute to affixing at least a portion of the scrubbing element 135 to the main body 105. For example, the binding strip 140 may include one or more hems, which may couple the scrubbing element 135 to the main body 105. For example, the first hem 143 and the second hem 144 may be configured to affix the binding strip 140 and/or at least a portion of the scrubbing element 135 to the main body 105.

In some embodiments, the first hem 143 and the second hem 144 may be similarly spaced relative to the width of the binding strip 140. For example, the first hem 143 may be located approximately one-sixth the width of the binding strip 140 as measured from a body edge (e.g., an edge of the binding strip 140 adjacent to the main body 105) and the second hem 144 may be located approximately one-sixth the width of the binding strip 140 as measured from the scrubbing edge (e.g., an edge of the binding strip 140 adjacent to the scrubbing element 135). Alternatively, or additionally, the first hem 143 and the second hem 144 may be unequally spaced across the width of the binding strip 140. For example, the first hem 143 may be located approximately one-sixth the width of the binding strip 140 as measured from the body edge and the second hem 144 may be located approximately two-thirds the width of the binding strip 140 as measured from the body edge.

In some embodiments, the binding strip 140 may include a width. The width of the binding strip 140 may vary based on the size of the towel 100*b*, the main body 105, and/or the scrubbing element 135. For example, ratio of the width of the binding strip 140 to the width of the towel 100*b* may be between approximately 1:20 and 1:25. For example, the ratio of the width of the binding strip 140 to the width of the towel 100*b* may be approximately 1:24. Alternatively, or additionally, the width of the binding strip 140 may include a predetermined size. For example, the width of the binding strip 140 may be approximately three quarters of an inch.

In some embodiments, the binding strip 140 may include a fabric that may differ from the fabric of the main body 105. For example, the binding strip 140 may include a cotton twill fabric. Alternatively, or additionally, the fabric of the binding strip 140 and the main body 105 may be the same or similar. For example, the binding strip 140 may include a cotton fabric and the main body 105 may include a cotton fabric. In some embodiments, the fabric of the binding strip 140 may be the same or similar as the fabric of the trim elements 110.

In some embodiments, the fabric of the binding strip 140 may include a fade resistant material. For example, a color associated with the binding strip 140 may be resistant to fading which may include in the presence of sunlight, repeated washings, etc. For example, in instances in which the color of the binding strip 140 is black, the color of the binding strip 140 may remain substantially black (e.g., not fade to gray or brown) in the presence of sunlight, washing, etc.

In some embodiments, the binding strip 140 may include an ultraviolet (UV) resistant material. For example, the binding strip 140 may be resistant to degradation due to the presence of UV light, e.g., having Grade 4 (slight fading) or Grade 5 (no fading) degree of fading after being exposed to a light source for 40 hours as described in AATCC 16 Colorfastness To Light.

Modifications, additions, or omissions may be made to the towel 100*b* without departing from the scope of the present disclosure. For example, in some embodiments, the towel 100*b* may include any number of other components that may not be explicitly illustrated or described.

Figure 3:
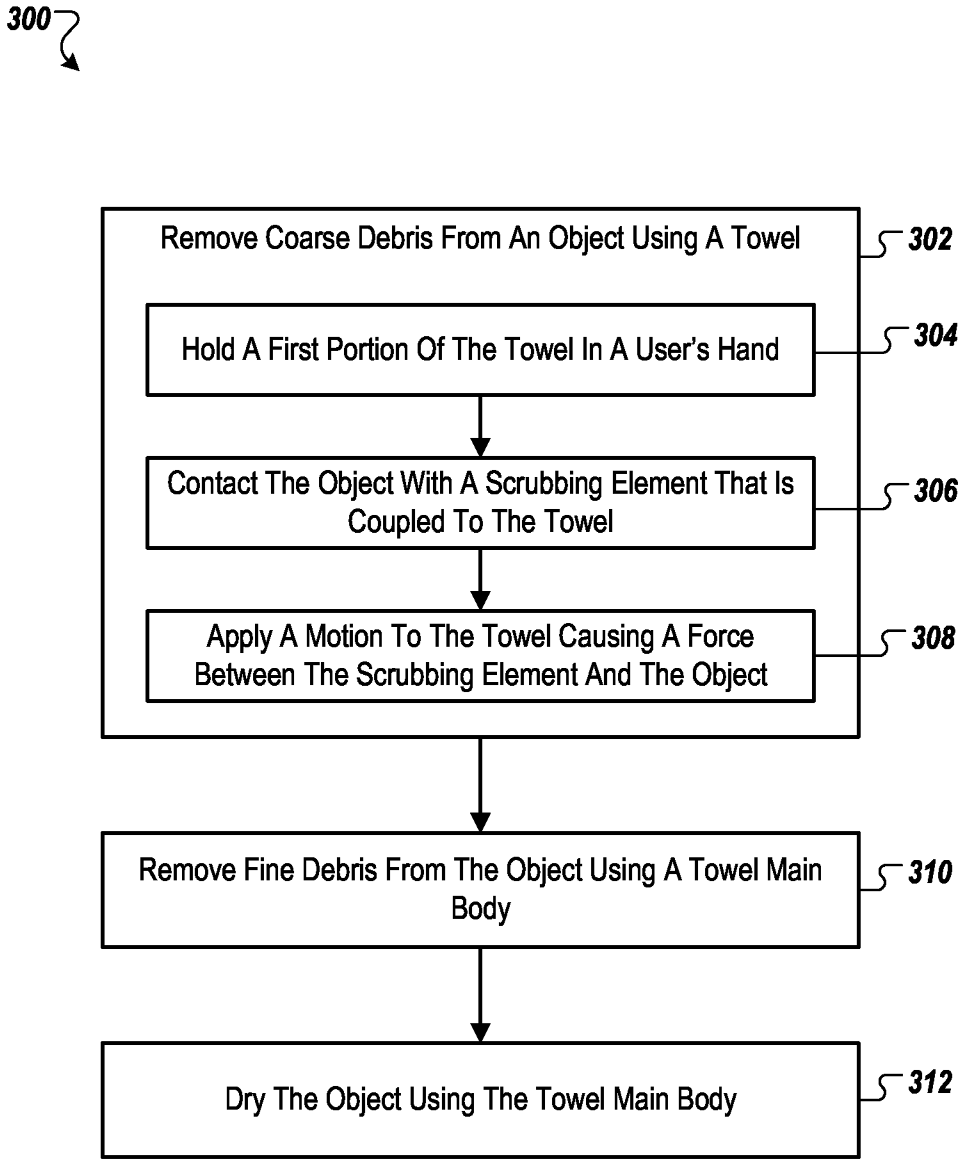
FIG. 3 illustrates a flowchart of an example method of using a towel including a scrubbing element.

FIG. 3 illustrates a flowchart of an example method 300. The method 300 may be arranged in accordance with at least one embodiment described in the present disclosure. Although illustrated as discrete blocks, various blocks may be divided into additional blocks, combined into fewer blocks, or eliminated, depending on the desired implementation.

The method 300 may begin at block 302 where coarse debris may be removed from an object using a towel. The removing coarse debris from an object using a towel may include blocks 304, 306, and/or 308.

At block 304, a first portion of the towel may be held in a user's hand. In some embodiments, the first portion may include a grip material.

At block 306, the object may be contacted with a scrubbing element that may be coupled to the towel.

At block 308, a motion may be applied to the towel which may cause a force between the scrubbing element and the object.

At block 310, fine debris may be removed from the object using a towel main body.

At block 312, the object may be dried using the towel main body.

Modifications, additions, or omissions may be made to the method 300 without departing from the scope of the present disclosure. For example, in some embodiments, the method 300 may include any number of other components that may not be explicitly illustrated or described.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A towel comprising:

a main body including a first material and having a first shape;

a scrubbing element coupled to a first side of the main body and including a second material and a second shape, the second material is different from the first material and the second shape is different from the first shape;

a grip element coupled to a second side of the main body opposite the first side of the main body and including a third material, and the third material is different from the first material and the second material; and a corner element coupled to a vertex of the main body that is distally disposed from the scrubbing element and has the second shape.

2. The towel of claim 1, further comprising one or more trim elements coupled to the main body, the one or more trim elements including a fourth material that is different from the first material, the second material, and the third material.

3. The towel of claim 2, wherein the scrubbing element is coupled to the main body by the one or more trim elements and a binding strip.

4. The towel of claim 1, further comprising a fabric strip including a first end and a second end, the first end and the second end each coupled adjacent to the vertex of the towel such that the fabric strip forms a loop wherein a ratio of a length of the fabric strip to a width of the fabric strip is between 8:1 and 12:1.

5. The towel of claim 1, wherein the grip element has a third material center point relative to the main body in approximately the same position as a center point of the scrubbing element relative to the main body.

6. The towel of claim 1, wherein the first material includes a waffle texture.

7. The towel of claim 1, wherein the first material includes a polyester polyamide blend.

8. The towel of claim 1, wherein a ratio of an area of the main body to an area of the scrubbing element is between 30:1 and 40:1.

9. The towel of claim 1, wherein the second material comprises an abrasive material.

10. A towel comprising:

a main body including a first material and having a first shape;

a scrubbing element coupled to a first side of the main body and including a second material, the second material is an abrasive material and is different from the first material, wherein a ratio of an area of the main body to an area of the scrubbing element is between 30:1 and 40:1 and the scrubbing element includes a second shape different than the first shape;

a grip element coupled to a second side of the main body opposite the first side of the main body and including a third material that is different from the first material and the second material, the grip element has a third material center point relative to the main body in approximately the same position as a center point of the scrubbing element relative to the main body; and a corner element coupled to a vertex of the main body that is distally disposed from the scrubbing element, wherein the corner element includes a fourth material and has the second shape.

11. The towel of claim 10, wherein the first material includes a polyester polyamide blend that includes a waffle texture.

12. The towel of claim 10, further comprising a hem configured to couple the scrubbing element to the main body and traversing only across a face of the main body such that the hem does not cover any edge of the main body.

13. The towel of claim 12, further comprising a fabric strip including a first end and a second end, the first end and the second end each coupled adjacent to the vertex of the main body such that the fabric strip forms a loop, wherein the first end and the second end of the fabric strip are coupled between the corner element and the main body.

14. The towel of claim 10, wherein the first shape is a square and the second shape is a triangle.

15. The towel of claim 10, wherein the scrubbing element and the corner element are the same size.

16. The towel of claim 10, further comprising a second corner element coupled to the vertex of the main body opposite the corner element, the second corner element includes the fourth material, has the second shape, and an area of the second corner element is the same as the area of the corner element.

17. A towel comprising: a main body including a first material and having a first shape;

a scrubbing element coupled to a first side of the main body and including a second material, and the second material is different from the first material and the scrubbing element includes a second shape different than the first shape;

a corner element coupled to a vertex of the main body that is distally disposed from the scrubbing element and has the second shape, and the corner element includes a third material different from the first and second materials; and a grip element coupled to a second side of the main body opposite the first side of the main body and including a fourth material that is different from the first material, the second material, and the third material.

18. The towel of claim 17, wherein the grip element has a center point relative to the main body in approximately the same position as a center point of the scrubbing element relative to the main body.

* * * * *